United States Patent
de Abreu Pinho et al.

(10) Patent No.: US 12,474,944 B2
(45) Date of Patent: Nov. 18, 2025

(54) OPPORTUNISTIC ON-PREM DATA REPATRIATION IN HYBRID CLOUDS

(71) Applicant: Dell Products L.P., Round Rock, TX (US)

(72) Inventors: Rômulo Teixeira de Abreu Pinho, Rio de Janeiro (BR); Vinicius Michel Gottin, Rio de Janeiro (BR); Joel Christner, El Dorado Hills, CA (US)

(73) Assignee: Dell Products L.P., Round Rock, TX (US)

( * ) Notice: Subject to any disclaimer, the term of this patent is extended or adjusted under 35 U.S.C. 154(b) by 671 days.

(21) Appl. No.: 17/659,614

(22) Filed: Apr. 18, 2022

(65) Prior Publication Data
US 2023/0333868 A1    Oct. 19, 2023

(51) Int. Cl.
G06F 9/44 (2018.01)
G06F 9/455 (2018.01)
G06F 9/50 (2006.01)

(52) U.S. Cl.
CPC .......... *G06F 9/45558* (2013.01); *G06F 9/505* (2013.01); *G06F 9/5072* (2013.01); *G06F 9/5077* (2013.01); *G06F 2009/4557* (2013.01)

(58) Field of Classification Search
CPC .................................................. G06F 9/45558
USPC .......................................................... 718/1
See application file for complete search history.

(56) References Cited

U.S. PATENT DOCUMENTS

| | | | |
|---|---|---|---|
| 11,394,397 B2 | 7/2022 | Teixeira De Abreu Pinho et al. | |
| 11,637,565 B2 | 4/2023 | Gottin et al. | |
| 11,641,212 B2 | 5/2023 | De Abreu Pinho et al. | |
| 2020/0267216 A1* | 8/2020 | Haggart | G06F 9/5088 |
| 2021/0036714 A1* | 2/2021 | Martin | G06F 13/1668 |

* cited by examiner

*Primary Examiner* — Timothy A Mudrick
(74) *Attorney, Agent, or Firm* — Workman Nydegger

(57) ABSTRACT

One example method includes selecting items to be repatriated from a cloud site to an on-premises site, and the items include a workload and a data set accessed by the workload, transmitting a repatriation request from the on-premises site to the cloud site, and the repatriation request identifies the selected items, receiving, by the on-premises site from the cloud site, a compressed data set which includes the data set in compressed form, receiving, by the on-premises site from the cloud site, a compressed workload which includes the workload in compressed form, and the compressed workload and the compressed data set have been compressed with a compression algorithm automatically selected based on content, and/or context, of data in the data set, decompressing, at the on-premises site, the compressed data set and the compressed workload, and deploying the decompressed data set and the decompressed workload locally at the on-premises site.

20 Claims, 6 Drawing Sheets

OPPORTUNISTIC ON-PREM DATA REPATRIATION IN HYBRID CLOUDS

FIELD OF THE INVENTION

Embodiments of the present invention generally relate to data and workload repatriation in cloud computing and cloud storage environments. More particularly, at least some embodiments of the invention relate to systems, hardware, software, computer-readable media, and methods for determining what customer data should be repatriated, and how that data should be compressed, so as to reduce or minimize costs of downloading the data to be repatriated.

BACKGROUND

Customers that use cloud infrastructure may have the opportunity to deploy pay-on-use on-premises infrastructure to repatriate their cloud workloads and associated data, that is, move their cloud workloads and associated data from a cloud environment back to an on-premises environment for example. One challenge with repatriation however arises from the fact the cloud service providers charge egress fees for accessing and downloading the data off the cloud platform. These fees may be prohibitive and, consequently, many repatriation initiatives are not carried out due to the expense.

Another problem regarding repatriation of workloads and data concerns data compression. Particularly, the best compression algorithm for some data may change, and be selected, according to characteristics of the data, such as content, and to the intended application, or context, for the data, which relate to SLA constraints. Nevertheless, in most data transmission use cases, including data migration initiatives, pre-defined or generic compression algorithms are indiscriminately applied to reduce the size of data sets prior to transmission. Consequently, an opportunity is lost to find a data compressor that satisfies different optimization criteria deriving from the SLA constraints.

Finally, the cost and availability of computing resources may impair efforts at data and workload repatriation. Particularly, data compression can be a compute and memory-intensive workload. Running compression algorithms on pay-for-use cloud systems may incur additional costs to data migration processes. Thus, balancing the cost of computation, and compression benefits, should also be considered in a prospective data and workload repatriation process.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Figure 1:
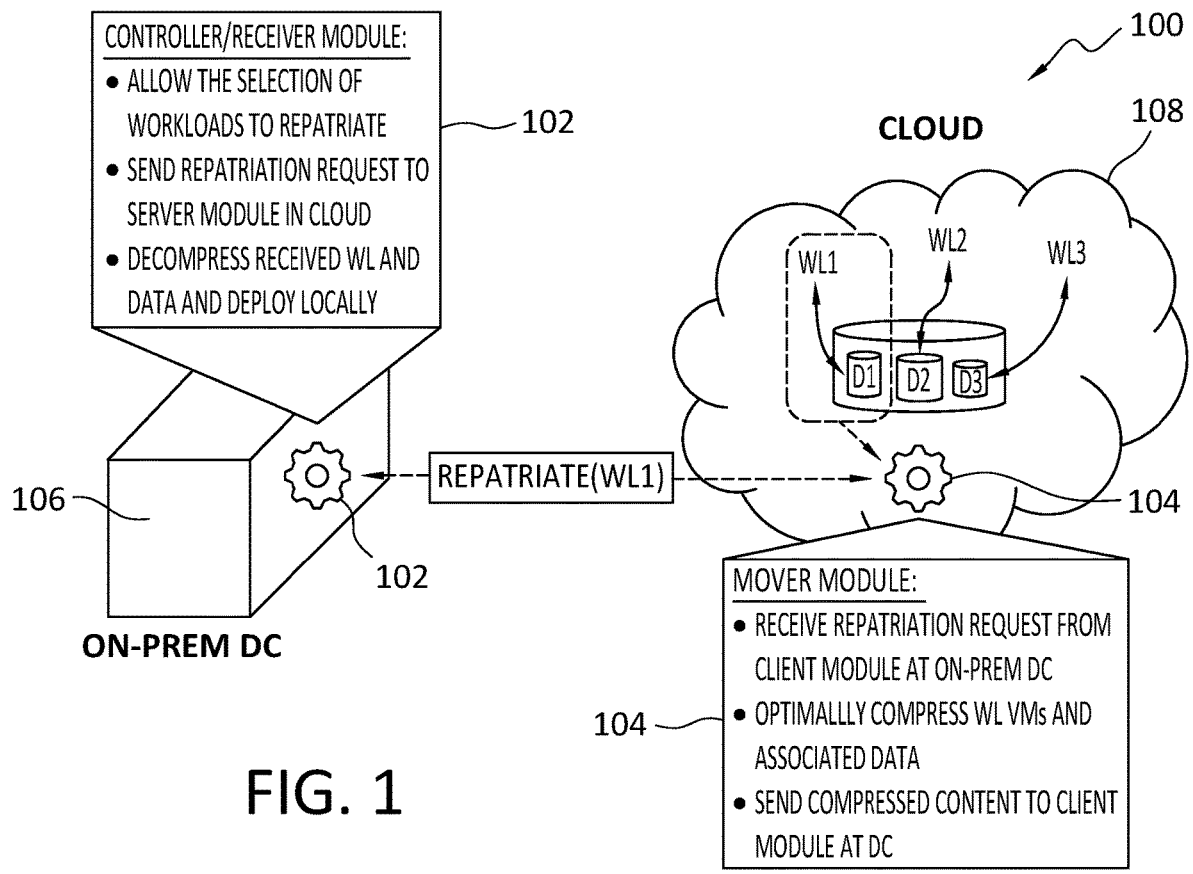
FIG. 1 discloses aspects of The proposed framework, with its two modules and their main responsibilities FIG. 2 discloses aspects of a mover module and its components, according to some example embodiments FIG. 3 discloses an example controller module installed on the destination on-premises infrastructure that deploys a mover module on the cloud infrastructure, where the workloads to be repatriated are located.

Embodiments of the present invention generally relate to data and workload repatriation in cloud computing and cloud storage environments. More particularly, at least some embodiments of the invention relate to systems, hardware, software, computer-readable media, and methods for determining what customer data should be repatriated, and how that data should be compressed, so as to reduce or minimize costs of downloading the data to be repatriated.

One way of reducing the costs of data repatriation is through lossless data compression. Reducing the size of the data to be repatriated has a direct impact on download costs, as less data would be sent. Content and context-aware compression may be employed to choose the best compression algorithm for some data, based both on data characteristics and on how the compressed data will be used. Thus, example embodiments are directed to a framework that may be employed to choose what data sets to repatriate and how to compress them to satisfy constraints imposed by the repatriation process, such as computing and data egress costs.

In some example implementations of the framework, a service may be deployed at the cloud end of infrastructure to track which data sets are used in the cloud-based workloads of the customer, which pieces of the workload used those data sets, and how often those data sets are used. As the customer builds the on-premises infrastructure and starts to repatriate pieces of the workloads, a controller module is deployed at the on-premises end to communicate with the data repatriation service in the cloud and identify which data are to be downloaded.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, an embodiment may help to reduce the costs typically associated with data repatriation from one environment to another environment. As another example, an embodiment may make data repatriation, previously cost-prohibitive, a viable option, at least on a cost basis, for a customer. Various other advantages of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. Aspects of An Example Architecture and Environment

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operaions, IO replication operations, data read/write/delete operations, data deduplication operations, data backup operations, data restore operations, data cloning operations, data archiving operations, and disaster recovery operations. More generally, the scope ofthe invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

B. Overview

As noted earlier herein, customers that use cloud infrastructure have a chance to deploy pay-on-use on-premises infrastructure to repatriate their cloud workloads and associated data. One of the primary challenges of moving workloads to on-premises infrastructure is how to repatriate data that reside in the cloud, also known as "data gravity." The challenge mainly arises from the fact that the cloud service providers charge egress fees, that is, when data is downloaded from their service, such as in the case of repatriation of data. These egress fees are often prohibitive and cause many repatriation initiatives to fail.

One way of reducing the costs of data repatriation is through lossless data compression. Reducing the size of the data to be repatriated has a direct impact on download costs, as less data would be sent. Lossless data compression solutions that may be employed for this type of operation are typically generic and are applied without regard to data types, context, or data set sizes. In addition, data sets to be repatriated are only those that will be used by the pieces of the customer workloads that have already been repatriated.

Thus, there may be benefits in employing content and context-aware compression to choose the best compression algorithm for some data, based both on data characteristics, such as file metadata and patterns within the data itself, and based on how the compressed data will be used, for example, in transmission to a customer, storage in an archive, or other. Thus, example embodiments are directed to the definition and use of a framework that may enable a customer to choose what data sets to repatriate, and how to compress them, to satisfy constraints imposed by the workloads, such as response times and download costs.

C. Aspects of Some Example Embodiments

In general, example embodiments may leverage the use of an optimization procedure for data compression algorithm selection, where examples of such procedures are disclosed in U.S. patent application Ser. No. 17/305,112, entitled PROBABILISTIC MODEL FOR FILE-SPECIFIC COMPRESSION SELECTION UNDER SLA-CONSTRAINTS, and filed 30 Jun. 2021 (the "'112 Application). The '112 Application is incorporated herein in its entirety by this reference.

In some examples of data compression selection procedures, a compression algorithm may be selected for some data out of a pool of candidate compressors, using only a small section of the data as input for the selection and a reference compressor. The selection may be such as to satisfy application-dependent SLA (service level agreement) constraints, provided as arguments, which may optimize for storage savings, speed of compression and/or decompression, cost of computation, overall time for data compression plus transmission plus decompression, or any combination of these.

With reference now to FIG. 1, example embodiments of a data compression algorithm selection framework 100, which may be referred to herein simply as a 'framework,' may comprise two modules, namely, a controller module 102 and a mover module 104. The controller module 102 and the mover module 104 may perform various respective functions, as shown in FIG. 1 and discussed below.

For example, the controller module 102 may be deployed on the on-premises infrastructure 106 and may serve as the receiving entity, or receiver, of any workloads, and associated data, repatriated from a cloud environment 108. The main responsibilities of the example controller module 102 may include the deployment of the mover module 104 in a location or site where the workloads to be repatriated are located, such as at the cloud environment 108 for example, the registration of workloads to be monitored, the selection of workloads to be repatriated, and the reception, decompression, and execution of the repatriated workloads. These responsibilities of the controller module 102, and the mover module 104, are described in further detail elsewhere herein. As shown in FIG. 1, various workloads 'WL' may be running in the cloud environment 108. Such workloads, and their associated respective data, may be repatriation candidates, as also shown in FIG. 1, where 'WL1' is being repatriated to the on-premises infrastructure 106.

Figure 2:
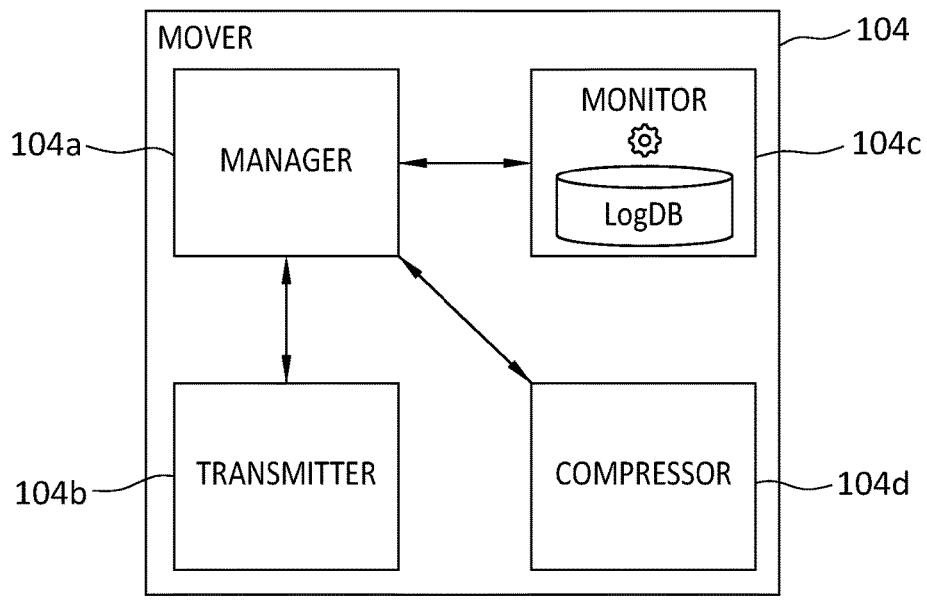

With continued attention to FIG. 1, and directing attention now to FIG. 2 as well, the mover module 104 may run on the cloud infrastructure where the workloads to be repatriated are located, and may be running. The main responsibilities of the mover module 104 may include the reception of requests from the controller module 102, the monitoring of workloads and their data accesses, the compression of a selected workload and associated data for repatriation, and the transmission of the data to the destination, such as the on-premises infrastructure 106 where the controller module 102 is running. The mover module 104 may comprise four components, each dedicated to a particular one of the mover module 104 responsibilities, namely, at manager component 104a, transmitter component 104b, monitor component 104c, and compressor component 104d.

C.1 Setup

C.1.1 Controller Module

This first part of the set-up of some example embodiments of the framework may comprise the installation of the controller module 102 on the on-premises infrastructure 106 that will receive the workloads and data repatriated from the cloud environment 108. The controller module 102 may run on various systems and devices, examples of which include, but are not limited to, a VM (virtual machine), container, or bare metal device that does not have an OS (operating system), but in any case, the controller module 102 may have visibility of any workload orchestration engine running on the on-premises infrastructure 106. Note that some embodiments may assume that the workload orchestration engine is the same on the cloud environment 108 and on the on-premises infrastructure 106. For example, if the workloads to be repatriated from the cloud environment 108 to the on-premises infrastructure 106 are Docker containers accessing Amazon S3 buckets, the on-premises infrastructure 106 should support Docker containers and S3 buckets as well. Thus, some embodiments of the controller module 102 may not manage the transformation of workloads from one workload orchestration platform to another, unless the respective workload orchestration platforms of the source and target entities for workload/data repatriation are different from each other, in which case, workload transformation may be performed.

C.1.2 Mover Module

Figure 3:
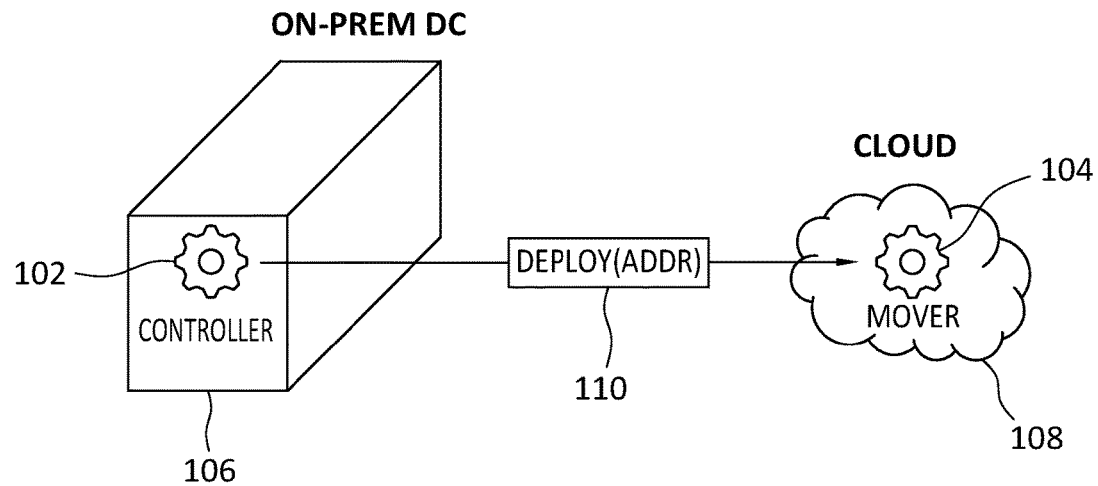

The second part of some example embodiments of the framework set-up may comprise the deployment of the mover module 104 in cloud environment 108, implemented via the controller module 102 'deploy' function 110, as illustrated in FIG. 3. Particularly, FIG. 3 discloses an example controller module 102, installed on the destination on-premises infrastructure 106, that may operate to deploy a mover module 104 on the cloud environment 108, where the workloads to be repatriated are located. The 'deploy' function 110 may receive a network address of the cloud environment 108 where the workloads to be repatriated are located. The function may install and launch the move service, which may run on the mover module 104, on the given address, where the move service waits for incoming requests from the controller module 102.

Figure 4:
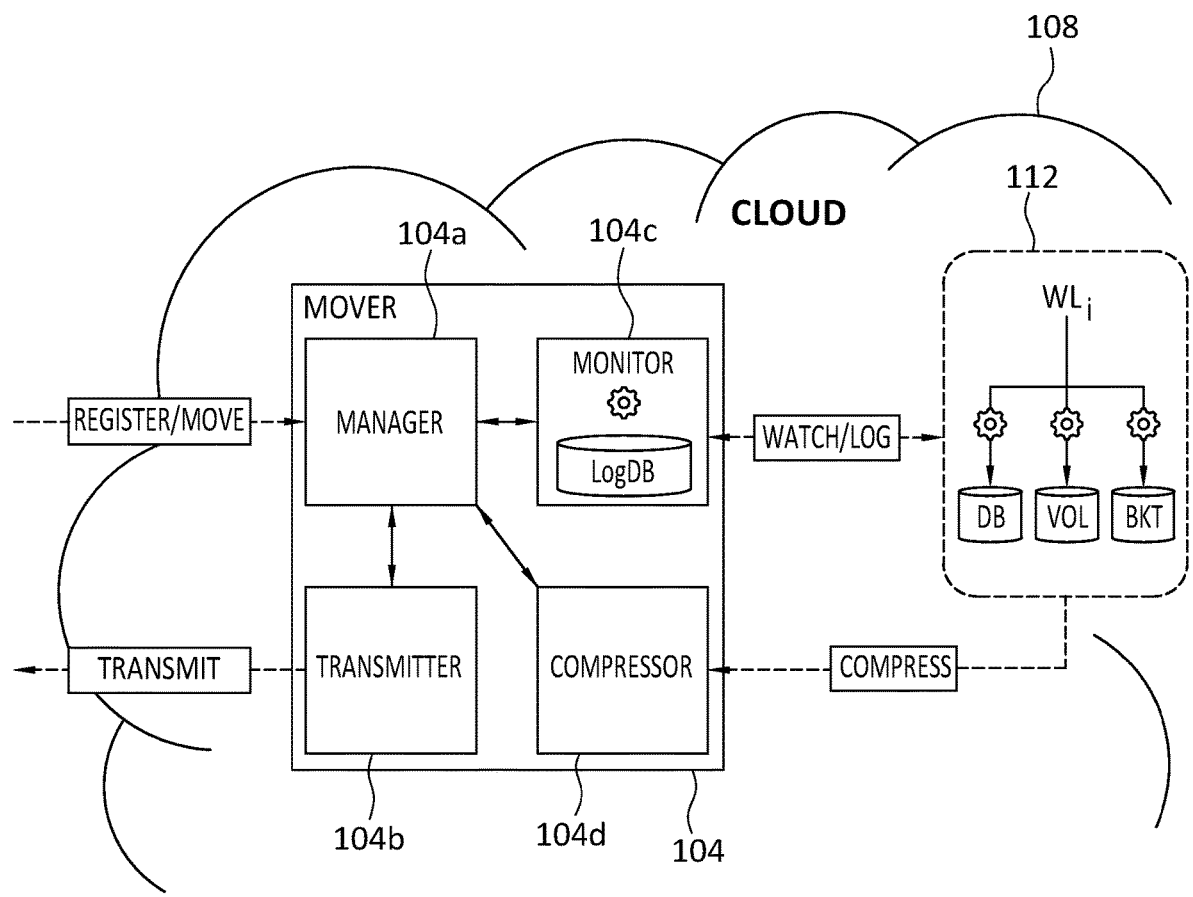
FIG. 4 discloses a mover module in the cloud, with its main components and functions.

With reference now to FIG. 4, and as noted earlier, the example mover module 102 may have four components, manager component 104a for management and the others transmitter component 104b, monitor component 104c, and compressor component 104d, for executing the responsibilities of the mover module 104, as describe earlier. In operation, the manager component 104a may receive requests, that is, workload 112 repatriation requests, from the controller module 102, and may execute the function(s) associated with those requests. For example, the manager component 104a may receive, from the controller module 102, a 'register' request to start monitoring, at the cloud environment 108, a given workload 112 and the data accesses made by that workload 112. On receipt of such a request, the manager component 104a may delegate to the monitor component 104c the task of instantiating and deploying watch and log services that track all data activities of the given workload 112. The manager component 104a may also request from the monitor component 104c logged information about a given workload 112, and the manager component 104a may delegate to the compressor component 104d the task of compressing workload 112 containers or virtual machines and the associated data.

Figure 5:
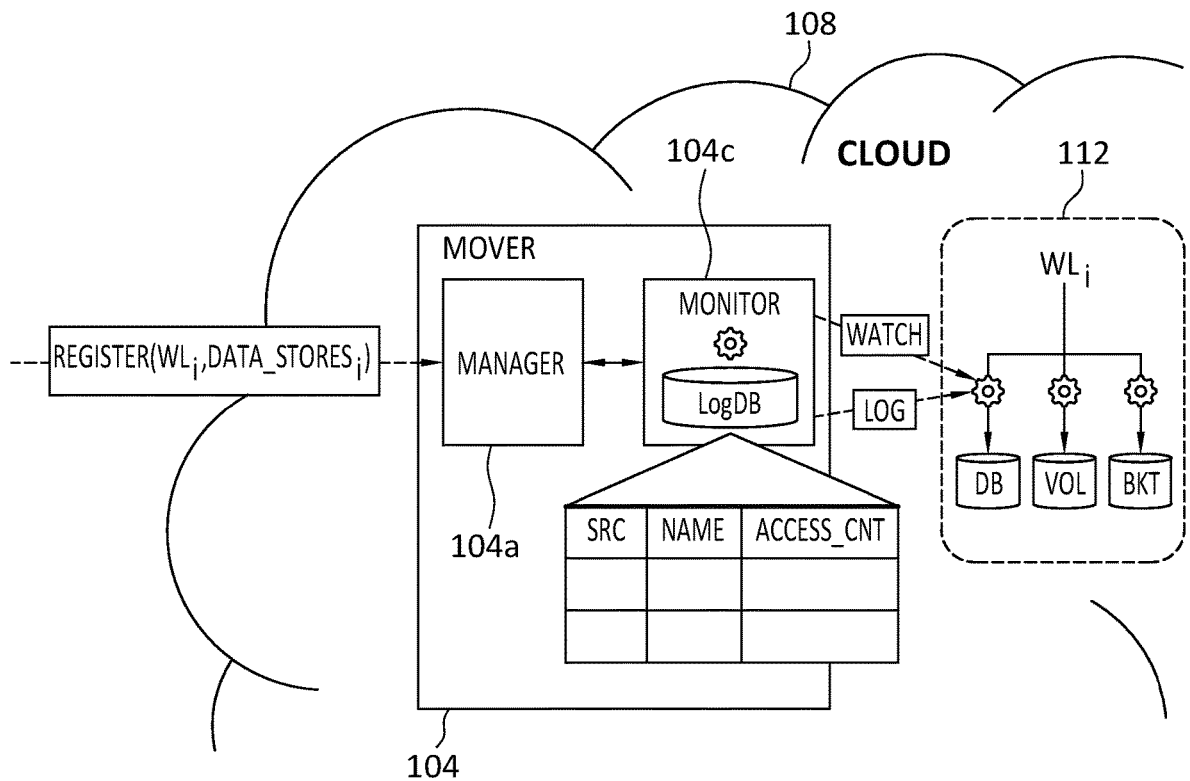
FIG. 5 discloses a monitor component within the mover module in a cloud.

In some example embodiments, and with reference now to the example of FIG. 5, the monitor component 104c may be responsible for watching all data access activities of a given workload 112 and logging those activities into a database. In the database, monitor component 104c may store the source of the data (such as a database instance, a bucket, a volume, a folder, for example), its name (such as a database table, an object, a file, for example), and how many times that data has been accessed since the watching service was instantiated, as illustrated in FIG. 5. As disclosed elsewhere herein, that data access count may be used by the manager component 104a to prioritize the data to be repatriated for a given workload 112. To briefly illustrate, frequently accessed data may be a better candidate for repatriation than data that is rarely, or never, accessed.

Figure 6:
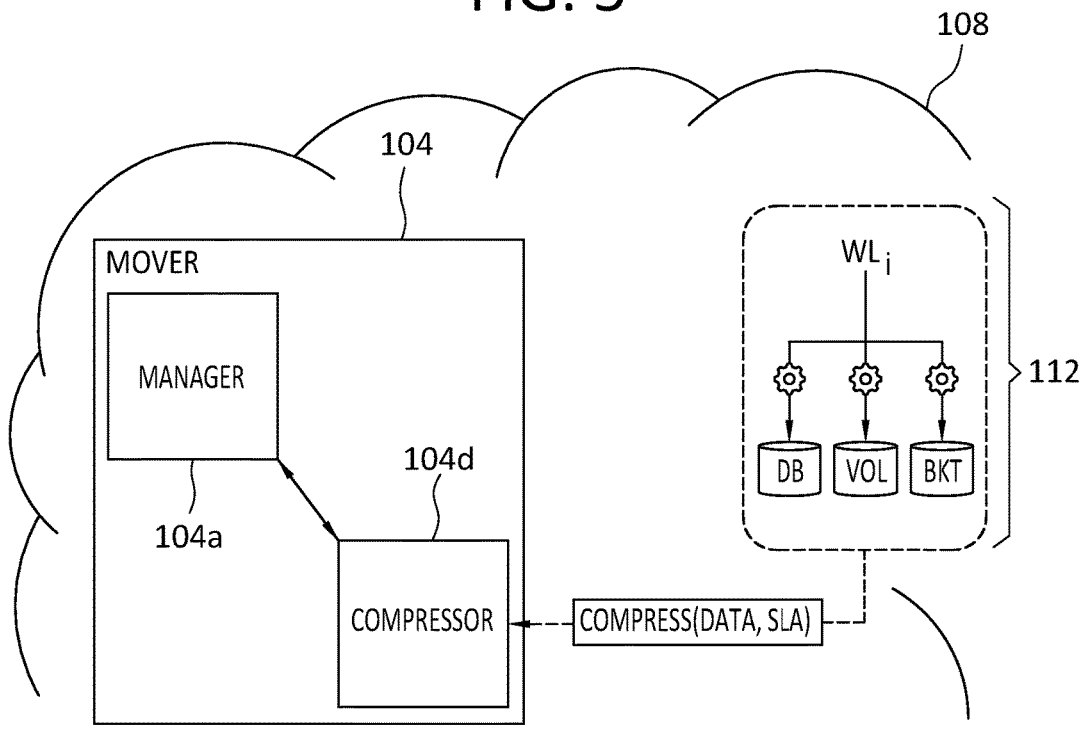
FIG. 6 discloses a compressor component within the mover module in the cloud.

Turning next to FIG. 6, the compressor component 104d (see FIG. 4) may receive, from the manager component 104 (see FIG. 4) instructions to compress some data, as illustrated in the example of FIG. 6. In example embodiments, the compressor component 104d may implement the data compressor selection functionality disclosed in the '112 Application. For example, the compressor component 104 may choose the best compression algorithm for the given data, considering data characteristics and SLA metrics that aim to reduce the egress cost of transferring the data from the cloud environment 108 to the on-premises infrastructure 106. The compressor component 104 may be deployed with pre-trained compression selection models that are applicable to different data types. Finally, and with continued reference to FIGS. 4-6, the transmitter component 104b may receive, from the manager component 104a, instructions to send compressed data to the destination on-premises infrastructure 106.

C.2 Workload and Data Movement

C.2.1 Registration

To repatriate a workload and its data, an initial operation may be to register the workload and data on the repatriation service. The following discussion assumes, for the purposes of illustration, that workloads at the on-premises infrastructure 106 and on the cloud environment 108 may be managed by a container engine, such as Docker or Kubernetes for example, but in fact, any virtualization engine may be used with embodiments of the disclosed framework.

After the controller module 102 is installed, and the mover module 104 deployed, as discussed elsewhere herein, a control panel on the controller module 102 may visually display a list of all active workload images which have been retrieved from the virtualization engine. The operator of the controller module 102 may select, using the control panel, which images should be monitored, and the controller module 102 may provide, to the operator, a list of data stores accessed by each image. In some embodiments, the data stores may be identified by an address and access credentials, if required.

The workload registration functionality may comprise sending, by the controller module 102 to the mover module 104, a request to register a user-selected workload 112 and its data stores. The request may arrive at the manager component 104a of the mover module 104. Upon receipt of the request, the manager component 104a may then forward the request to the monitor component 104c, which, in turn, may spawn the service(s) that intercept and log accesses, by the selected workload 112, to each object in the stores. For example, if the data store is a database, the monitor component 104c may retrieve the schemas and tables and logs every access of the database by the registered workload 112. Similarly, if the data store is a volume, the monitor component 104c may list all folders and files and may log the workload 112 access to those folders and files.

In some embodiments at least, the monitor component 104c may have its own logging database, where it saves the data access activities of all monitored workloads 112. On the first access by a monitored workload 112 of particular data, the monitor component 104c may create a new entry in its database, indicating the data store, the name of the accessed object, such as a table or file for example, and set the access count value to 1. For every additional access, by the monitored workload 112, to that same object, the monitor component 104c may increment the access count value. The aforementioned sequence of operations may occur whenever a new workload 112 is registered on the repatriation service.

C.2.2 Movement

Some example embodiments may assume that the owner of the workloads 112 explicitly selects which workloads should be repatriated at any point in time. Embodiments may also assume that selected workloads 112 are gracefully shutdown before being moved. To do this, the user may initiate the repatriation of the selected workloads 112, using the control panel of the controller module 102.

Particularly, for each workload 112, the controller module 102 may send a request to the mover module 104, which may arrive at the manager component 104a of the mover module 104. Upon receipt of the request, the manager component 104a may gracefully shut down the workload 112, and query the monitor component 104c logging database to retrieve all data objects accessed in descending access count order. In this way, the most accessed data will be prioritized in the repatriation.

Note that as used herein, a 'graceful' shutdown of a workload 112 includes a graceful shutdown in a Kubernetes environment, further details of which can be found at: https://learnk8s.io/graceful-shutdown. The scope of the invention is not limited to any particular workload shutdown process however, and the foregoing is provided only by way of illustration, and not limitation.

For each data object retrieve in a query issued by the manager component 104a, the manager component 104a may send, to the compressor component 104d, a request to compress the data in order to minimize the cost of repatriation. Thus, the criterion is some embodiments is an SLA constraint to be satisfied. Example embodiments may assume that the compressor component 104d obtains, from the cloud environment 108 management system interfaces, the cost associated with computation on the (virtual) machine that the cloud environment 108 is running, and also any data egress fees. With such cost information, the compressor component 104d may be able to select the best compression algorithm for each identified data set.

Figure 7:
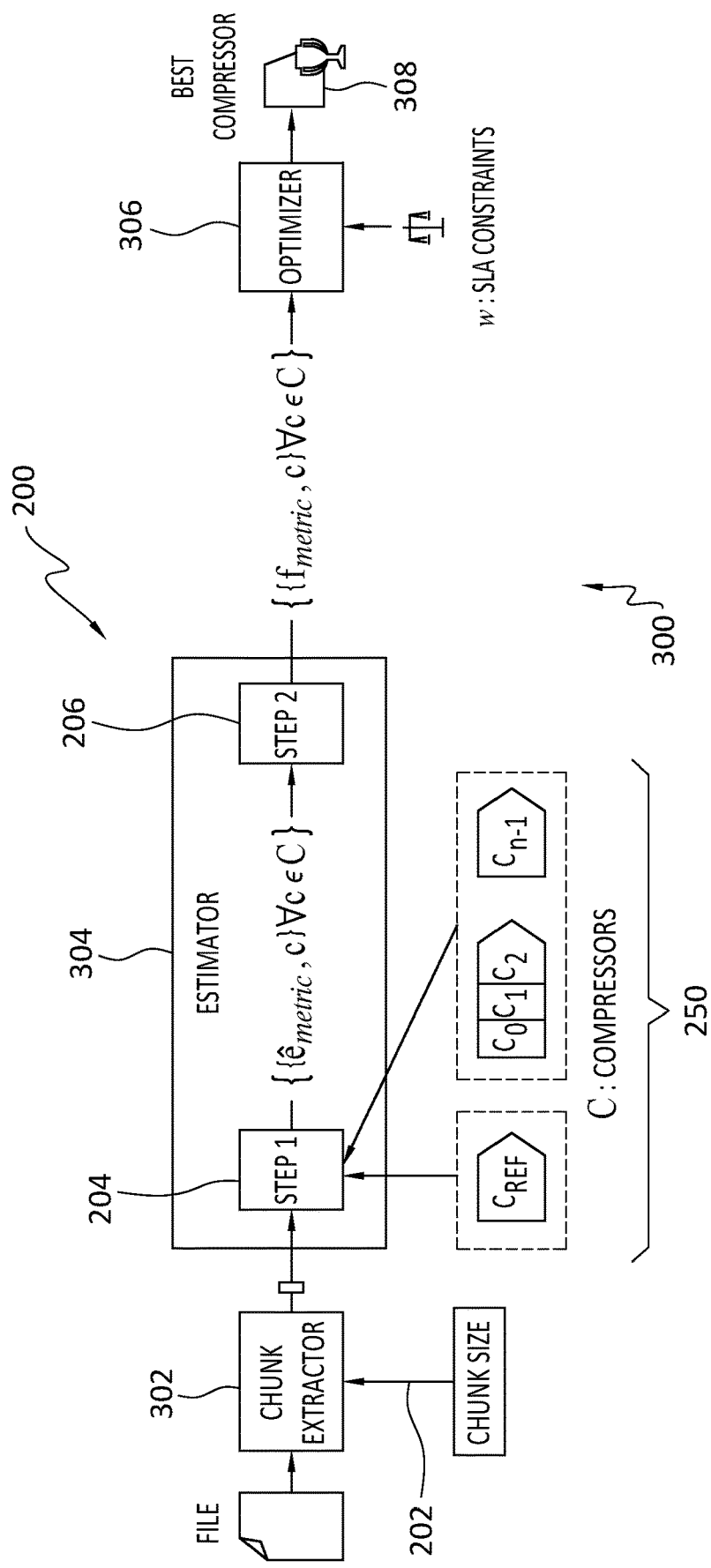
FIG. 7 discloses the SLA-oriented selection of the best compression algorithm for some data.

Turning next to FIG. 7, there is disclosed a method 200 for implementing an SLA-oriented selection of the best compression algorithm for some specified data that is associated with a workload 112. The compression algorithm 200 may be implemented by the system 300. The compression algorithm may be selected based on other criteria in addition to, or instead of, SLA requirements.

Particularly, as disclosed in the '112 Application, and illustrated in FIG. 7, the compressor component 104d may extract 202, a small chunk of the data, such as a file for example, that is to be compressed. The extraction 202 may be performed by a chunk extractor 302 of the compressor component 104d.

The compressor component 104d may, at 204, while operating as part of an estimator module 304, use a reference compression algorithm, such as a generic compressor of the zip family for example, to estimate for the chunk, in 'Step 1,' compression performance metrics, such as compression ratio and compression time for example, of some or all lossless compression algorithms 250 that (1) are compatible with the type of the data to be compressed (for example, zip and JPEG lossless for images, zip and FLAC for audio, and zip for text) and (2) are available in the compressor component 104d. Note that different configurations of the same compression algorithms may be considered different compressors, at least in this context.

At 206, 'Step 2,' the estimations of the compression performance metrics on the input chunk, generated at 204, may be converted, by the estimator 304, into estimations of compression performance metrics for the whole object from which the chunk was taken 202. An optimizer 306 may then receive, from the estimator 304, the estimated performance metrics and the SLA constraints to be satisfied to select the best compression algorithm 3080 from the set of available compression algorithms.

With continued reference to FIG. 7, further details are provided concerning the algorithm 200 and system 300 disclosed there. Particularly, embodiments may operate to select an algorithm C* that aims to satisfy a cost-related SLA constraint. This constraint may be defined as:

$$C^* = \mathrm{argmin}(egress\_cost + compute\_cost)$$

where, $$egress\_cost = f(compression\_ratio, cloud\_egress\_fee)$$

and, $$compute\_cost = f(compression\_cpu\_time, cloud\_compute\_fee).$$

The egress_cost function may comprise a multiplication of (1) the file size resulting from the estimated compression ratio of the selected compressor and (2) the egress fee charged by the cloud environment 108 provider.

Similarly, the compute_cost may be a multiplication of (1) the estimated time to compress the data and (2) the computation fee charged by the cloud environment 108 provider. The estimated time and size result may directly from the compression performance metrics obtained through Step 1 (reference 204) and Step 2 (reference 206) above of the method 200 for SLA-oriented compression selection, shown in FIG. 7.

After a compressor algorithm has been selected (see reference 308 in FIG. 7), and with reference again to FIG. 4, the compressor component 104d may then execute the chosen compression algorithm in the data repository of the mover module 104, and the compressor component 104d may also notify the manager component 104a that that data is being, or has been, compressed. The manager component 104a may, in turn, send a notification to the transmitter component 104b, which may then transmit the compressed data to the controller module 102 at the on-premises infrastructure 106.

The controller module 102 may then receive the compressed data and metadata indicating the particular compressor that was used to compress the data. In some embodiments at least, the controller module 102 and the mover module 104 have the same set of compressors. Thus, the controller module 102 may match the decompressed data with any data that was initially registered together with the workload. The controller module 102 may also handle re-creation, at the on-premises infrastructure 106, of the data stores such as, for example, databases, volumes, and buckets, on the on-premises infrastructure 106, so that the repatriated workload 112 can be relaunched with all the required, repatriated, data ready for usage.

The last operation in some example embodiments of a repatriation process is the movement of the workload images, such as containers, virtual machines, and processes for example, themselves, from the cloud environment 108 to the on-premises infrastructure 106. Conceptually at least, the process for moving the workload images may be the same as, or similar to, as moving the compressed data. One possible difference between the process for moving data and the process for moving workload images is that the compression selection process, for the workload images, may also take into account compression algorithms that may be dedicated to the compression of such images. Other than this however, all other compression and transmission steps of a data movement process, as disclosed herein, may also apply to the handling of workload images. Upon receipt of the compressed workload images, the controller module 102 may decompress the images with the appropriate compression algorithm and relaunch them on the on-premises infrastructure 106.

D. Further Discussion

As disclosed herein, example embodiments may provide various useful features and functions. For example, embodiments may implement and use a framework for the repatriation of workloads from a cloud infrastructure to an on-premises infrastructure. The framework may employ optimal SLA-oriented, content-aware compression mechanisms to minimize the cost, such as egress fees, associated with moving data out of the cloud infrastructure. Note that, while example embodiments of the framework may serve as a solution for repatriating data in a hybrid cloud structure, such as from a cloud infrastructure to an on-premises infrastructure, embodiments of the framework may also be applied to any data movement operation within, and across, cloud environments.

E. Example Methods

Figure 8:
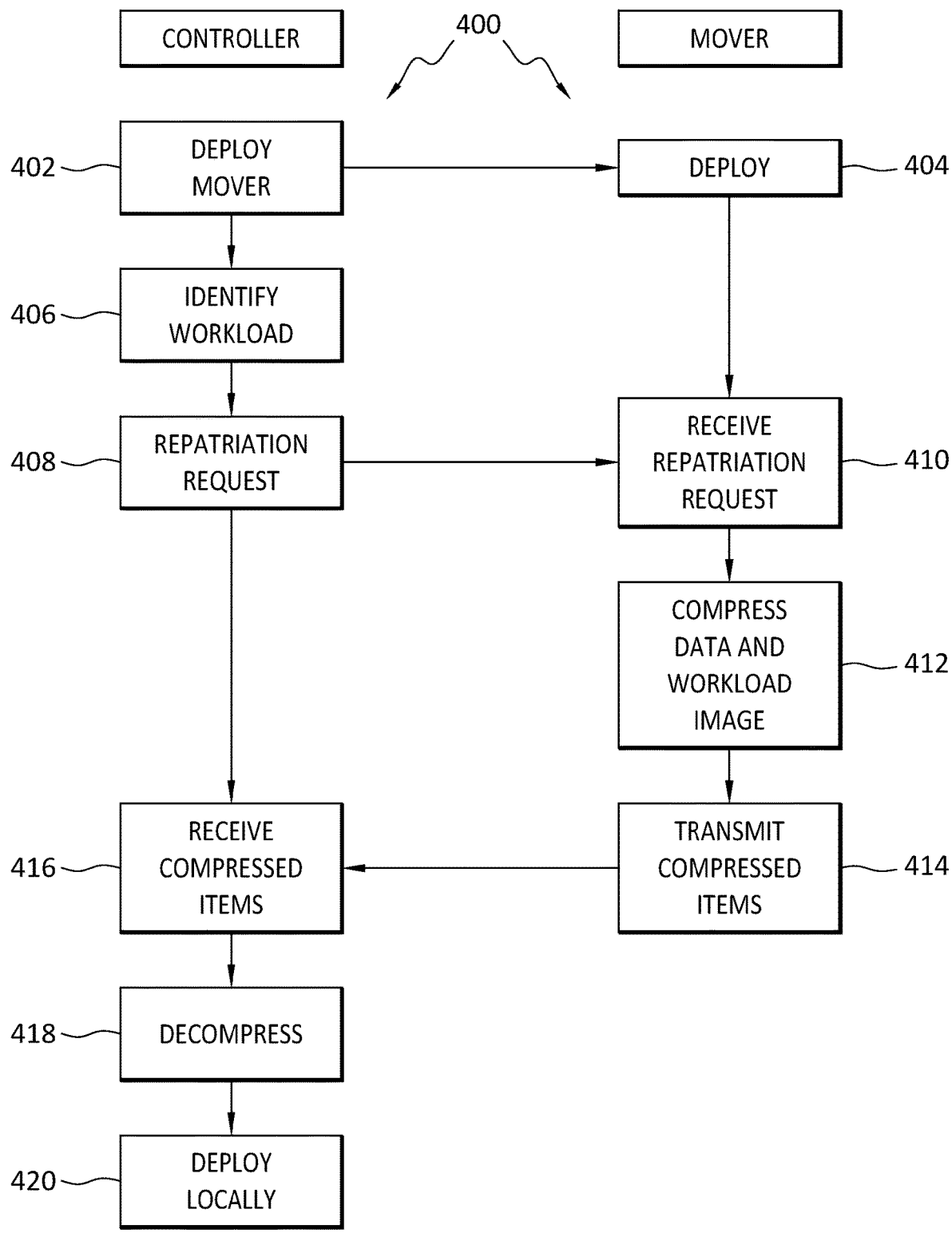
FIG. 8 discloses an example method according to some embodiments.

It is noted with respect to the disclosed methods, including the example method of FIG. 8, that any operation(s) of any of these methods, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Directing attention now to FIG. 8, an example method 400 for data repatriation is disclosed. The method 400 may be performed in a hybrid-cloud environment, such as from a cloud infrastructure to an on-premises infrastructure, but no particular operating environment is required. In at least some embodiments, instantiation of the method 800 may be performed by a controller module, residing at an on-premises infrastructure, and a mover module directed by the controller module and running in a cloud environment.

The example method 400 may begin at 402 when a controller, such as at an on-premises infrastructure, deploys a mover that is hosted on a cloud site. The mover may then deploy 404 and await instructions from the controller.

At some point, the controller may identify 406 one or more workloads and/or associated data that are to be repatriated to the on-premises infrastructure. These workloads and data may be identified in a repatriation request issued 408 by the controller to the mover. The mover may receive 410 the repatriation request and then select an appropriate compressor and compress 412 the data and/or workload images identified in the repatriation request. The compressed items may then be transmitted 414 by the mover to the controller.

The controller may then receive 416 the compressed items. The compressed items may be decompressed 418, by the controller or at the direction of the controller, possibly with the same algorithm that the mover used to compress the items 412 initially. The decompressed items, which may comprise one or more workloads and/or their respective data, may then be locally redeployed 420 at the on-premises infrastructure, or other site.

F. Further Example Embodiments

Following are some further example embodiments of the invention. These are presented only by way of example and are not intended to limit the scope of the invention in any way.

Embodiment 1. A method, comprising: selecting items to be repatriated from a cloud site to an on-premises site, and the items comprise a workload and a data set accessed by the workload; transmitting a repatriation request from the on-premises site to the cloud site, and the repatriation request identifies the selected items; receiving, by the on-premises site from the cloud site, a compressed data set which comprises the data set in compressed form; receiving, by the on-premises site from the cloud site, a compressed workload which comprises the workload in compressed form, wherein the compressed workload and the compressed data set have been compressed with a compression algorithm automatically selected based on content, and/or context, of data in the data set; decompressing, at the on-premises site, the compressed data set and the compressed workload; and deploying the decompressed data set and the decompressed workload locally at the on-premises site.

Embodiment 2. The method as recited in embodiment 1, wherein the data set is selected for repatriation based on a number of times that the data set has been accessed, at the cloud site, by the workload.

Embodiment 3. The method as recited in embodiment 2, further comprising receiving, from the cloud site, information comprising the number of times that the data set has been accessed.

Embodiment 4. The method as recited in any of embodiments 1-3, wherein the context comprises one or more requirements of a service level agreement.

Embodiment 5. The method as recited in embodiment 4, wherein the compression algorithm was selected based at least in part on an expected cost to repatriate the compressed data.

Embodiment 6. The method as recited in embodiment 4, wherein the compression algorithm is one of a group of compression algorithms available at the cloud site for compression of data and workloads.

Embodiment 7. The method as recited in any of embodiments 1-6, wherein selecting items for repatriation comprises receiving a selection signal from a user, and the selection signal identifies the items.

Embodiment 8. The method as recited in any of embodiments 1-7, wherein the repatriation request comprises a request, to the cloud site, to (1) register the data set and the workload, and (2) monitor accessing of the data set by the workload.

Embodiment 9. The method as recited in any of embodiments 1-8, wherein the workload comprises a virtual machine.

Embodiment 10. The method as recited in any of embodiments 1-9, further comprising running the decompressed workload at the on-premises site, using the decompressed data set.

Embodiment 11. A system, comprising hardware and/or software, operable to perform any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-10.

G. Example Computing Devices and Associated Media

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 9:
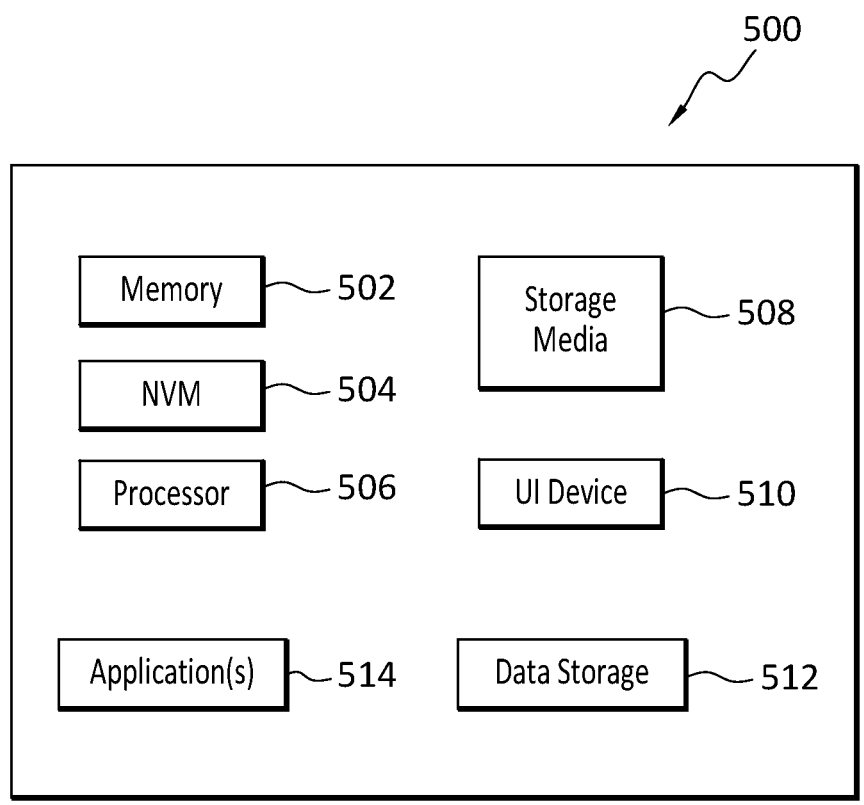
FIG. 9 discloses a computing entity that is operable to perform any of the disclosed methods, processes, and operations.

With reference briefly now to FIG. 9, any one or more of the entities disclosed, or implied, by FIGS. 1-8 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 9.

In the example of FIG. 9, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI (user interface) device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
deploying, by a controller at an on-premises site, a mover module hosted on a cloud site, and operations of the mover module are directed by the controller, and deploying the mover module comprises installing and launching a move service at the cloud site;
selecting, by a user using a control panel of the controller, items to be repatriated from the cloud site to the on-premises site, wherein the items comprise a workload running at the cloud site and a data set accessed by the workload;
transmitting, by the controller, a repatriation request from the on-premises site to the mover module at the cloud site, wherein the repatriation request identifies the selected items;
receiving, by the controller at the on-premises site from the mover module at the cloud site, a compressed data set which comprises the data set in compressed form;
receiving, by the controller at the on-premises site from the mover module at the cloud site, a compressed workload which comprises the workload in compressed form, and metadata indicating that the workload and the data set have been compressed with a selected compression algorithm identified as a best compression algorithm as among a group of compression algorithms, where identification of the best compression algorithm relates to characteristics of data in the data set, and those characteristics include file metadata and patterns within the data, and based on an expected use for the compressed data set;

decompressing, by the controller at the on-premises site, the compressed data set and the compressed workload; and deploying, by the controller, the decompressed data set and the decompressed workload locally at the on-premises site, and executing, by the controller, the decompressed workload.

2. The method as recited in claim 1, wherein the data set is selected for repatriation based on a number of times that the data set has been accessed, at the cloud site, by the workload.

3. The method as recited in claim 2, further comprising receiving, from the cloud site, information comprising the number of times that the data set has been accessed.

4. The method as recited in claim 1, wherein the egress cost is related to one or more requirements of a service level agreement.

5. The method as recited in claim 1, wherein the egress cost comprises a cost to repatriate the compressed data.

6. The method as recited in claim 4, wherein the compression algorithm is one of the plurality of compression algorithms available at the cloud site for compression of data and workloads.

7. The method as recited in claim 1, wherein selecting items for repatriation comprises receiving a selection signal from a user, and the selection signal identifies the items.

8. The method as recited in claim 1, wherein the repatriation request comprises a request, to the cloud site, to (1) register the data set and the workload, and (2) monitor accessing of the data set by the workload.

9. The method as recited in claim 1, wherein the workload comprises a virtual machine.

10. The method as recited in claim 1, further comprising running the decompressed workload at the on-premises site, using the decompressed data set.

11. A non-transitory storage medium having stored therein instructions that are executable by one or more hardware processors to perform operations comprising:

deploying, by a controller at an on-premises site, a mover module hosted on a cloud site, and operations of the mover module are directed by the controller, and deploying the mover module comprises installing and launching a move service at the cloud site;

selecting, by a user using a control panel of the controller, items to be repatriated from the cloud site to the on-premises site, wherein the items comprise a workload running at the cloud site and a data set accessed by the workload;

transmitting, by the controller, a repatriation request from the on-premises site to the mover module at the cloud site, wherein the repatriation request identifies the selected items;

receiving, by the controller at the on-premises site from the mover module at the cloud site, a compressed data set which comprises the data set in compressed form;

receiving, by the controller at the on-premises site from the mover module at the cloud site, a compressed workload which comprises the workload in compressed form, and metadata indicating that the workload and the data set have been compressed with a selected compression algorithm identified as a best compression algorithm as among a group of compression algorithms, where identification of the best compression algorithm relates to characteristics of data in the data set, and those characteristics include file metadata and patterns within the data, and based on an expected use for the compressed data set;

decompressing, by the controller at the on-premises site, the compressed data set and the compressed workload; and deploying, by the controller, the decompressed data set and the decompressed workload locally at the on-premises site, and executing, by the controller, the decompressed workload.

12. The non-transitory storage medium as recited in claim 11, wherein the data set is selected for repatriation based on a number of times that the data set has been accessed, at the cloud site, by the workload.

13. The non-transitory storage medium as recited in claim 12, wherein the operations further comprise receiving, from the cloud site, information comprising the number of times that the data set has been accessed.

14. The non-transitory storage medium as recited in claim 11, wherein egress cost is related to one or more requirements of a service level agreement.

15. The non-transitory storage medium as recited in claim 11, wherein the egress cost comprises a cost to repatriate the compressed data.

16. The non-transitory storage medium as recited in claim 14, wherein the compression algorithm is one of the plurality of compression algorithms available at the cloud site for compression of data and workloads.

17. The non-transitory storage medium as recited in claim 11, wherein selecting items for repatriation comprises receiving a selection signal from a user, and the selection signal identifies the items.

18. The non-transitory storage medium as recited in claim 11, wherein the repatriation request comprises a request, to the cloud site, to (1) register the data set and the workload, and (2) monitor accessing of the data set by the workload.

19. The non-transitory storage medium as recited in claim 11, wherein the workload comprises a virtual machine.

20. The non-transitory storage medium as recited in claim 11, wherein the operations further comprise running the decompressed workload at the on-premises site, using the decompressed data set.

* * * * *